(12) United States Patent
Mesecher (10) Patent No.: US 7,551,139 B1
(45) Date of Patent: Jun. 23, 2009

(54) MULTI-PLATFORM PRECISION PASSIVE LOCATION OF CONTINUOUS WAVE EMITTERS

(75) Inventor: David Keith Mesecher, Melville, NY (US)

(73) Assignee: Northrop Grumman Corporation, Los Angeles, CA (US)

( * ) Notice: Subject to any disclaimer, the term of this patent is extended or adjusted under 35 U.S.C. 154(b) by 42 days.

(21) Appl. No.: 11/432,940

(22) Filed: May 12, 2006

(51) Int. Cl.
*G01S 3/02* (2006.01)
(52) U.S. Cl. .................. 342/465; 342/387; 342/463
(58) Field of Classification Search ............... 342/378, 342/387, 463–465
See application file for complete search history.

(56) References Cited

U.S. PATENT DOCUMENTS

| | | | |
|---|---|---|---|
| 4,601,025 A | 7/1986 | Lea | |
| 5,008,679 A * | 4/1991 | Effland et al. | 342/465 |
| 5,302,957 A | 4/1994 | Franzen | |
| 5,477,230 A | 12/1995 | Tsui | |
| 5,568,154 A | 10/1996 | Cohen | |
| 5,675,553 A * | 10/1997 | O'Brien et al. | 367/135 |
| 5,774,087 A | 6/1998 | Rose | |
| 5,920,278 A | 7/1999 | Tyler et al. | |
| 5,990,833 A | 11/1999 | Ahlbom et al. | |
| 6,021,330 A * | 2/2000 | Vannucci | 342/457 |
| 6,061,022 A | 5/2000 | Menegozzi et al. | |
| 6,255,992 B1 | 7/2001 | Madden | |
| 6,577,272 B1 | 6/2003 | Madden | |
| 6,806,828 B1 | 10/2004 | Sparrow et al. | |
| 7,406,434 B1 * | 7/2008 | Chang et al. | 705/10 |
| 2003/0058924 A1 | 3/2003 | Darby et al. | |
| 2005/0012660 A1 | 1/2005 | Nielsen et al. | |
| 2005/0046608 A1 | 3/2005 | Schantz et al. | |

OTHER PUBLICATIONS

J.M. Pimbley, Recursive maximum likelihood estimation of complex autoregressive processes, IEEE Transactions on Acoustics, Speech, and Signal Processing, vol. 38(8), p. 1466-1467, Aug. 1990.*

H.M. Shertukde et al., Use of the wideband cross-correlation for tracking targets in a low SNR environment, IEEE International Conference on Systems Engineering, p. 324-326, Aug. 1990.*

(Continued)

*Primary Examiner*—Thomas H Tarcza
*Assistant Examiner*—Fred H Mull
(74) *Attorney, Agent, or Firm*—Robert P. Lenart, Esq.; Pietragallo Gordon Alfano Bosick & Raspanti, LLP (57) ABSTRACT

An apparatus comprises a first sensor mounted on a first platform for sampling a first portion of a continuous waveform occurring in a time window and for producing a first signal sample, a second sensor mounted on a second platform for sampling a second portion of the continuous waveform occurring in the time window for producing a second signal sample, and a processor for determining time difference of arrival measurements and for applying a maximum likelihood estimation process to combine multiple time difference of arrival measurements between multiple pairs of platforms, to estimate the location of an emitter of the continuous waveform. A method performed by the apparatus is also provided.

21 Claims, 2 Drawing Sheets

OTHER PUBLICATIONS

Y.T. Chan et al., Approximate maximum likelihood delay estimation via orthogonal wavelet transform, IEEE Transactions on Signal Processing, vol. 47(4), p. 1193-1198, Apr. 1999.*

M. Birchler, E911 Phase 2 Location Solution Landscape, FCC Location Round Table, Wireless Access Technology Research, Motorola Labs, Jun. 1999.*

D.A. Streight et al., Maximum likelihood estimates of the time and frequency differences of arrival of weak cyclostationary digital communications signals, 21st Century Military Communications Conference (MILCOM) Proceedings, vol. 2, p. 957-961, Oct. 2000.*

L. Cong et al., Non-line-of-sight error mitigation in TDOA mobile location, IEEE Global Telecommunications Conference, vol. 1, p. 680-684, Nov. 2001.*

M. Kawabata et al., Performance evaluation of TDOA system based on maximum likelihood location estimation in cellular systems, Electronics and Communications in Japan (Part 1: Communications), vol. 88(6), p. 47-54, Feb. 2005.*

M. Aatique, Evaluation of TDOA Technique for Position Location in CDMA System, Master's Thesis at Virginia Polytechnic Institute and State University, p. i-iii and 104, Sep. 1997.*

FDOA, Wikipedia, http://en.wikipedia.org/wiki/FDOA.*

* cited by examiner

MULTI-PLATFORM PRECISION PASSIVE LOCATION OF CONTINUOUS WAVE EMITTERS

FIELD OF THE INVENTION

This invention relates to methods and apparatus for locating radio frequency emitters, and more particularly to such methods and apparatus for locating continuous waveform emitters.

BACKGROUND OF THE INVENTION

In order to meet the requirements of Network Centric Warfare, existing sensing platforms, such as the E-2 early warning, command and control aircraft, will have to be leveraged through the use of emerging architectures and technologies. Specifically, they will be called upon to perform fast, accurate location of targets, including traditional threat emitters such as radars, which use waveforms that have widely separated pulses with well-defined leading edges. In addition, fast, accurate location of an emerging set of target emitters, which have more continuous waveforms, is becoming increasingly important. These non-traditional target emitters include communications terminals that might be associated with terrorists, drug dealers, urban combatants, and emergency-first-response rescue personnel. Such communications terminals may include cell phones, PDAs, laptop computers, and other devices.

To address these target emitters, legacy platforms will have to be equipped with the sensor and sensor-management capability, and the communications infrastructure to support multi-platform collaborative targeting. In a collaborative targeting system, participating sensor platforms can contribute multiple measurements that are dependant on the target emitter's location, such as the Angle of Arrival (AOA). By taking advantage of the geometries available with multiple platforms, the geometric dilution of precision (GDOP) resulting from finite measurement accuracy can be avoided, and fast yet accurate location can be obtained from measurements such as AOA.

Although AOA can generally be measured for most emitter types, other precision measurements, such as Time Difference of Arrival (TDOA), are traditionally applied to radar emitters, because radars emit easy-to-distinguish pulses with leading edges that enable time of arrival to be measured. Applying techniques to continuous waveform emitters, such as communications terminals, is less straightforward, however, due to the absence of a well-defined event, such as the leading edge of a pulse that would enable measurement of the time of arrival. There is a need, then, for a method for passively determining the location of continuous wave emitters in multi-platform network centric systems.

SUMMARY OF THE INVENTION

This invention provides an apparatus comprising a first sensor mounted on a first platform for sampling a first portion of a continuous waveform occurring in a time window and for producing a first signal sample, a second sensor mounted on a second platform for sampling a second portion of the continuous waveform occurring in the time window for producing a second signal sample, and a processor for determining time difference of arrival measurements and for applying a maximum likelihood estimation process to combine multiple time difference of arrival measurements between multiple pairs of platforms, to estimate the location of an emitter of the continuous waveform.

In another aspect, the invention provides a method comprising the steps of: using a first sensor mounted on a first platform to sample a first portion of a continuous waveform occurring in a time window to produce a first signal sample, using a second sensor mounted on a second platform to sample a second portion of the continuous waveform occurring in the time window to produce a second signal sample, time shifting the first signal sample with respect to the second signal sample, correlating the first and second signal samples to determine a time difference of arrival measurement, and applying a maximum likelihood estimation process to combine multiple time difference of arrival measurements between multiple pairs of platforms, to estimate the location of an emitter of the continuous waveform.

In yet another aspect, the invention provides an apparatus comprising a first sensor mounted on a first platform for sampling a first portion of a continuous waveform occurring in a time window and for producing a first signal sample, a second sensor mounted on a second platform for sampling a second portion of the continuous waveform occurring in the time window for producing a second signal sample, and a processor for determining frequency difference of arrival measurements and for applying a maximum likelihood estimation process to combine multiple frequency difference of arrival measurements between multiple pairs of platforms, to estimate the location of an emitter of the continuous waveform.

In still another aspect, the invention provides a method comprising the steps of using a first sensor mounted on a first platform to sample a first portion of a continuous waveform occurring in a time window to produce a first signal sample, using a second sensor mounted on a second platform to sample a second portion of the continuous waveform occurring in the time window to produce a second signal sample, determining frequency difference of arrival measurements from the first and second signal samples, and applying a maximum likelihood estimation process to combine multiple frequency difference of arrival measurements between multiple pairs of platforms, to estimate the location of an emitter of the continuous waveform.

DETAILED DESCRIPTION OF THE INVENTION

Figure 1:
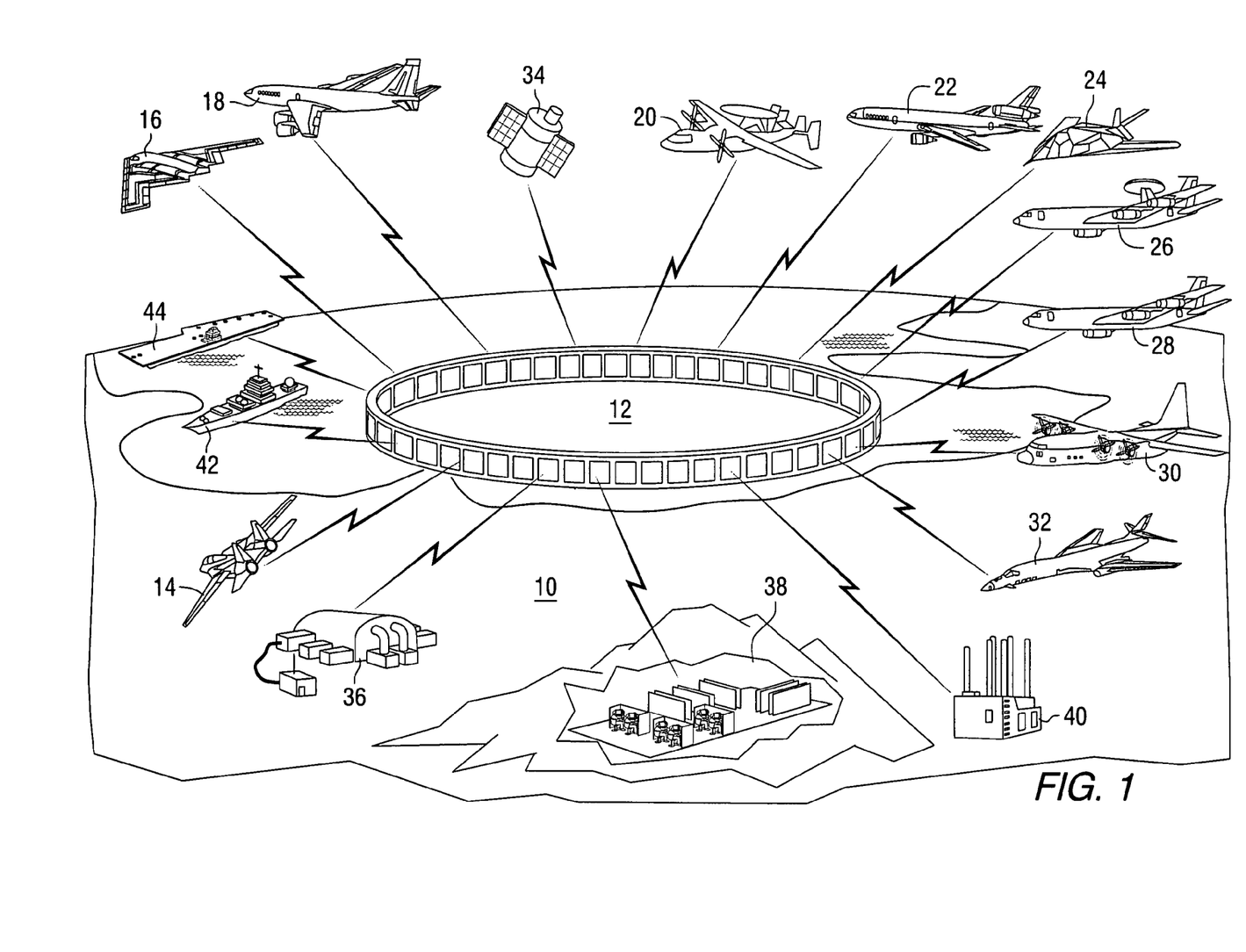
FIG. 1 is a schematic representation of a network centric system.

Referring to the drawings, FIG. 1 depicts a network centric environment that can be used to implement the invention. The system 10 in this example includes a plurality of information sources that supply information to a command center 12 (or central processing center) that includes equipment for processing information received from the sources. As used on the following description, the term "processor" encompasses any type of equipment for processing information received from the sources. The information sources (also referred to as platforms), can be for example, air vehicles 14, 16, 18, 20, 22, 24, 26, 28, 30 and 32 (which can be manned or unmanned);

satellites 34, ground vehicles or installations 36, 38, and 40; and/or ships 42 and 44. The platforms can include one or more sensors for supplying information about an area and/or target of interest. The platforms can communicate with the central processing center via a plurality of communication links. Information produced by the sensors must be processed so that decisions can be made based on that information. This information can be processed using one or more processors, or computers, in the command center according to predetermined algorithms to produce target decisions. A broadband digital communications network, such as Transformational MILSATCOM (TSAT), can be used to transfer information between the various platforms and the command center.

One of the functions performed in the system of FIG. 1 is the identification of the location of emitters of radio frequency signals. Multi-platform collaboration enables the use of derived precision emitter location techniques that do not lend themselves to single-platform implementation, such as Time Difference of Arrival (TDOA) and Frequency Difference of Arrival (FDOA). It is these derived precision techniques, and their application to locating non-traditional target emitters, such as communications terminals, which are referred to as Third Generation Collaborative Targeting (3GCT), that can be enabled by broadband airborne connectivity.

3GCT technology focuses on achieving fast, accurate geolocation of targets using passive location techniques implemented in a multi-platform collaborative configuration in which the participating sensing platforms, which have advanced Electronic Support Measures (ESM) capabilities, work in a coordinated fashion, and are connected by a broadband Internet Protocol (IP) communications infrastructure. By taking advantage of advanced ESM capabilities such as digital sampling of target emitter waveforms at each sensor platform, and broadband connectivity to transport these digitized samples to a common processing node, the application of multi-platform precision geolocation techniques such as TDOA and FDOA can be extended beyond the typical set of target emitters such as radars, which have waveforms with widely spaced pulses providing well-defined events in time, to an expanded set of target emitters, including emitters with continuous waveforms that do not contain well-defined events in time, such as communications terminals and other devices. The use of a Generalized Recursive Maximum Likelihood Estimation (GRMLE) method to combine any number of measurements and mixture of measurement types (TDOA, FDOA, AOA, etc.) further enables the application of multi-platform location to continuous waveform emitters.

Figure 2:
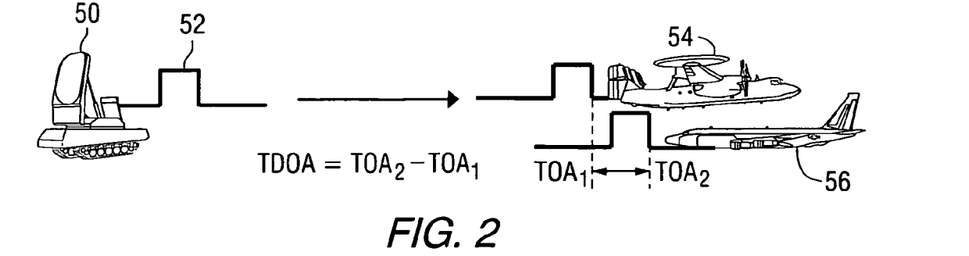
FIG. 2 is a schematic diagram illustrating a time difference of arrival (TDOA) sensing system for pulsed emitters.

FIG. 2 is a schematic diagram illustrating TDOA sensing for pulsed waveform emitters such as radars. An emitter 50 emits a pulse waveform signal 52 that is received by sensors at platforms 54 and 56. The sensors can be, for example, radio frequency receivers. The time of arrival of the pulse waveform at platform 54 is $TOA_1$, and time of arrival of the pulse waveform at platform 56 is $TOA_2$. Since platform 56 is further away from the emitter than platform 54, the signal is received at a later time at platform 56. The time difference of arrival (TDOA) is then: $TDOA=TOA_2-TOA_1$.

In the pulse waveform example of FIG. 2, measurement of TDOA is relatively straightforward. The Time of Arrival (TOA) of a pulse can be measured at a sensor platform by thresholding on the leading edge of that pulse. TOAs of the same pulse from pairs of measurement platforms can be transmitted to a common processing node over a low-bandwidth communications infrastructure, where the TDOA is derived by subtracting corresponding TOAs.

With continuous waveform target emitters, such as communications terminals, there is no well-defined event in time, such as a pulse leading edge, to measure. However, if two measurement platforms both take digital samples of the target emitter's waveform at the same instant in time, or if they both take digital samples and time-tag the samples using a synchronized time reference such as GPS time, and those digitized samples are transmitted to a common processing node, the two digitized samples can be time shifted with respect to one another and a correlation between the two time shifted samples can be observed. When a peak in the correlation is found, the amount of time shift used to obtain this peak is equivalent to the TDOA of the target emitter from the point of view of the two measurement platforms.

Figure 3:
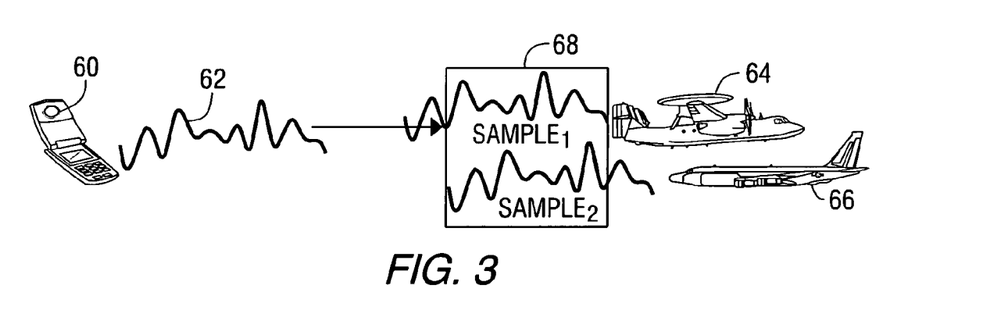
FIG. 3 is a schematic diagram illustrating coordinated sampling of an emitter waveform.

FIG. 3 is a schematic diagram illustrating the coordinated sampling of a continuous emitter waveform. An emitter 60 emits a continuous waveform signal 62 that is received by sensors at platforms 64 and 66. Since platform 66 is further away from the emitter than platform 64, the signal is received at a later time at platform 66. The signal is sampled in a window, illustrated by block 68. The sampling can be achieved by analog-to-digital conversion of the portion of the continuous signal that occurs in the time interval defined by the sampling window. This results in a digital representation of the portion of the continuous waveform that occurred in the sampling window. The digital representations of the two signal samples can then be transmitted over a collaborative targeting network to a common processing node, where they are time shifted and correlated. The window size is sufficient such that the sampled waveform at each of the platforms includes a common portion of the continuous emitter waveform.

Figure 4:
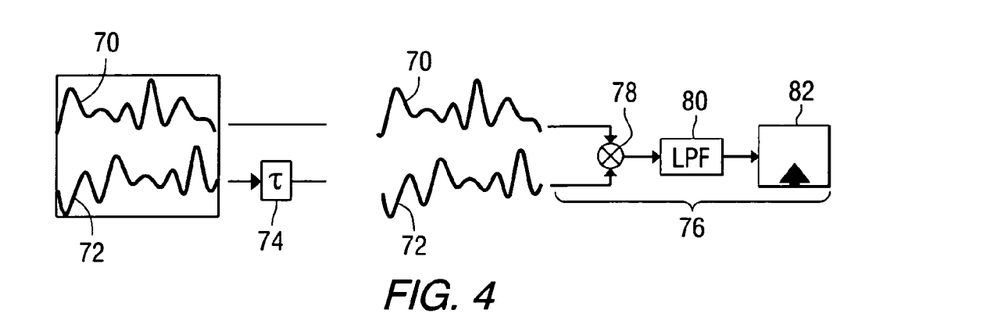
FIG. 4 is a schematic diagram illustrating time shifting and correlation of samples.

FIG. 4 is a schematic diagram illustrating time shifting and correlation of signal samples. Signal samples 70 and 72 are captured at the platform sensors and transmitted to the processing node. A time delay 74 is added to signal sample 72. Then the signal sample 70 and the time delayed signal sample 72 are processed by a correlator 76, which can be part of a radio receiver. The correlator is shown to include a mixer 78, a low pass filter 80 and an output 82 that is indicative of the degree of correlation of the received signals.

Figure 5:
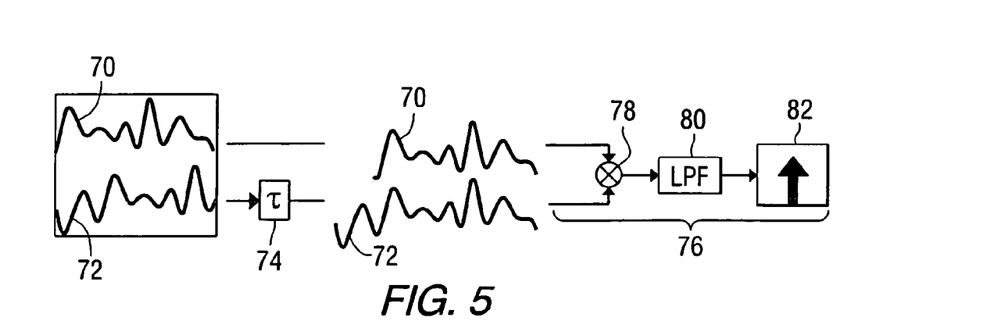
FIG. 5 is a schematic diagram illustrating a time shift equal to the TDOA, when correlation peak is observed.

The sample waveforms can be caused to line up by applying a time delay to create a peak in the correlation. When this peak is observed, the time delay used to obtain the peak is equal to the TDOA of the sampled signal between the two measurement platforms. FIG. 5 is a schematic diagram illustrating that the time shift equals TDOA when the correlation peak is observed.

While FIGS. 4 and 5 show an analog waveform signal, it will be appreciated by those skilled in the art that sampling of the analog waveform signal results in digital representations of the waveform signal. One of the digital signals would be delayed with respect to the other and the time delay at peak correlation would equal the TDOA. This approach to determining TDOA of continuous waveform target emitters requires the shared capability of the participating measurement platforms to perform digital sampling of the emitter waveform. It also requires a communications infrastructure with sufficient bandwidth to transport these digitized waveforms, which, depending on the geometry and on the target emitter's bandwidth, could contain megabytes of data, to a common processing node for time shifting and correlation.

3GCT takes advantage of advanced ESM capabilities, and broadband connectivity, used in a multi-platform collaborative architecture, to provide passive, fast, precision geolocation of all target emitters, including communications terminals that might be used by terrorists, drug dealers, and urban combatants. By knowing the TDOAs between at least two pairs of platforms, and the locations of these platforms, the location of the emitter can be determined.

Each TDOA measurement defines a curve (specifically, a hyperbola) in two dimensions (or a hyperbolic surface in three dimensions) on which the emitter lies. If two TDOA measurements are available, the location of the emitter can be uniquely determined in two dimensions, as shown in previous work. In three dimensions, three measurements are needed. If there are more than two TDOA measurements, or if there is some combination of TDOA and other measurements that is greater than two (referred to as an "over-determined" condition), (or, in three dimensions, if there are more than three TDOA measurements, or if there is some combination of TDOA measurements and other measurements that is greater than three), then an optimal combination of the measurements, such as a Maximum Likelihood Estimate (MLE), can be used.

The architectural challenge in applying TDOA to locate communications terminal targets is to be able to transport the digitized sampled emitter waveform, which could be megabytes of data, depending on the target waveform and the geometry, over the collaborative targeting network. With potentially hundreds of targets needing to be located within a short span of time, this could overwhelm a conventional collaborative targeting network. With broadband digital connectivity however, such as Transformational MILSATCOM (TSAT), TDOA can be applied to communications terminal targets.

Frequency Difference of Arrival (FDOA) relies on the Doppler effect caused by motion of the sensor platform with respect to the signal source. In principle, when two measurement platforms both measure the Frequency of Arrival (FOA) of an emitter's waveform, the measurements will differ by a small amount due to the different platform-to-target speeds. In the case of pulsed emitters, the FOA can actually be the Pulse Repetition Frequency (PRF), which can be determined fairly accurately by measuring over a wide span of pulses. By then transmitting these two measurements over the network to a common processing node, FDOA can be derived from the pair of FOA measurements obtained from the pair of platforms. However, with emitters that emit continuous waveforms, in practice, it is extremely difficult to measure FOA with sufficient precision from two separate platforms to detect the small differences in frequency that FDOA relies on. An alternative is to allow the frequency difference to be detected at a common processing node that can jointly process the signals seen by each of the two sensor platforms. As in the case of TDOA for communications terminals, this approach requires broadband airborne connectivity.

In the case of frequency difference of arrival (FDOA), extremely small differences in measured frequency must be detected in order for this technique to be effective, so measuring the Frequency of Arrival (FOA) independently at a pair of platforms would not likely provide the accuracy needed to derive FDOA. However, if digital samples of the target emitter's waveform detected at a pair of measurement platforms are transported to a common processing node, the two samples can be processed jointly to detect small differences in frequency. Again, the broadband connectivity in concert with the capability to perform digital sampling, is required to enable this approach.

To extract FDOA by jointly processing the two samples of the emitter waveform at the common processing node, first, both signal samples would be transformed from the time domain to the frequency domain using a digital Fourier Transform. Then, one transformed signal is frequency shifted with respect to the transform of the other signal sample while the correlation between the two transformed samples is observed. The maximum correlation occurs at a frequency shift equal to the FDOA of the continuous waveform between the two collection platforms. By knowing the FDOAs between at least two pairs of platforms, and the locations of these platforms, the location of the emitter can be determined.

Each FDOA measurement defines a curve in two dimensions (or a surface in three dimensions) on which the emitter lies. If two FDOA measurements are available, the location of the emitter can be uniquely determined in two dimensions, as shown in previous work. In three dimensions, three measurements are needed. If there are more than two FDOA measurements (referred to as an "over-determined" condition), or if there is some combination of FDOA and other measurements that is greater than two, (or, in three dimensions, if there are more than three FDOA measurements, or if there is some combination of FDOA measurements and other measurements that is greater than three), then an optimal combination of the measurements, such as a Maximum Likelihood Estimate (MLE), is used.

In another embodiment, both TDOA and FDOA measurements can be taken and a combination of TDOA and FDOA information can be used to determine the location of the target emitter.

In addition to TDOA and FDOA, other measurement types, such as AOA, range, and even location estimates, are often available from sensing platforms. By taking advantage of a broadband communications infrastructure that connects all measurement platforms to a common processing node, any and all measurement types that are available can be utilized to generate an optimal location estimation that automatically takes into account measurement accuracy and geometry. Such integration of any and all measurement types available, without having to have prior knowledge of which type of measurements will be made or how much data will be collected, can be achieved through the use of a Maximum Likelihood Estimator.

The MLE, in summary, provides the flexibility to combine any number and any combination of measurements in order to obtain the best possible, or most accurate, geolocation estimate by using as many measurements as are available, and by combining mixed measurement types. Such flexibility is important in implementing 3GCT because in a diverse multi-platform system it is impossible to predict which measurement types or how many measurements will be available in locating any given target.

Unfortunately, due to the non-linear relationship between measurements and target location, a closed form expression for the MLE generally cannot be found. To allow the application of the MLE to 3GCT in the presence of mixed measurement types and in over-determined conditions, a novel Generalized Recursive MLE method was developed. In this method, an initial guess of the target's location is made, and then an approximate MLE is found based on a "linearized" approximation of the relationship between measurements and target location about the initial guess. This solution represents an approximation to the Maximum Likelihood Estimate (MLE) based on the linearized version of the problem. It becomes the next guess at the true MLE, and the process is repeated. A detailed description of this Generalized Recursive MLE method follows.

The Generalized Recursive Maximum Likelihood Estimator approach to location estimation can be used to obtain a location estimation that is optimal in the maximum likelihood sense, and can be used with any number of measurements and any mixture of measurement types, even if the total number of measurements available is greater than a critically constrained number. The critically constrained number of measurements is equal to the number of unknown variables that are being estimated; two in the case of two-dimensional location (the X and Y positions of the target emitter), and three in the case of three-dimensional location (the X, Y, and Z positions of the emitter). This estimation technique takes into account the measurement accuracy of each individual measurement; the dependency, or correlation, if any, between measurements; and the geometry.

The explanation provided herein assumes a two-dimensional location problem. This can be easily generalized, however, to the three-dimensional problem. It will be further evident that this approach can be applied to not only location problems, but to any estimation problem in which the estimate is based on measurements that are dependant on the quantities being estimated.

As stated above, the described location estimation problem involves location in two dimensions, resulting in two unknown quantities that will be estimated; the X and Y positions of the emitter: $X_e$ and $Y_e$. Several measurements are made from various sensors, and each measurement is dependant on the quantities to be estimated. For example, if the measurement is the angle of arrival (AOA) of the emitter's waveform at a measurement platform, then the relationship between the measurement and the quantities to be estimated is as follows:

$$AOA = \arctan\left(\frac{y_e - y_p}{x_e - x_p}\right)$$

where $x_p$ and $y_p$ are the x and y positions of the measurement platform, which are assumed to be accurately known through some navigation system, such as GPS.

In another example, if the measurement is the Time Difference of Arrival (TDOA) between two measurement platforms of the emitter's waveform, then the relationship between the measurement and the quantities to be estimated is as follows:

$$TDOA = \frac{\sqrt{(x_e - x_{p1})^2 + (y_e - y_{p1})^2} - \sqrt{(x_e - x_{p2})^2 + (y_e - y_{p2})^2}}{c}$$

where $x_{p1}$, $y_{p1}$, $x_{p2}$, and $y_{p2}$ are the x and y positions of platforms 1 and 2, respectively, which are again presumed to be known accurately through some navigation system, and c is the speed of light.

In yet another example, if the measurement is the Frequency Difference of Arrival (FDOA) between two measurement platforms of the emitter's waveform, then the relationship between the measurement and the quantities to be estimated is as follows:

$$FDOA = \frac{1 + \left\{\frac{v_{x1}(x_e - x_{p1}) + v_{y1}(y_e - y_{p1})}{c \times \sqrt{(x_e - x_{p1})^2 + (y_e - y_{p1})^2}}\right\}}{1 + \left\{\frac{v_{x2}(x_e - x_{p2}) + v_{y2}(y_e - y_{p2})}{c \times \sqrt{(x_e - x_{p2})^2 + (y_e - y_{p2})^2}}\right\}}$$

where $x_{p1}$, $y_{p1}$, $x_{p2}$, and $y_{p2}$ are the x and y positions of platforms 1 and 2, respectively, which are again presumed to be known accurately through some navigation system; $v_{x1}$, $v_{y1}$, $v_{x2}$, and $v_{y2}$ are the x and y speeds of platforms 1 and 2, respectively, which are also presumed to be known accurately through some navigation system; and c is the speed of light.

In still another example, if the measurement is the range between the measurement platform and the emitter, then the relationship between the measurement and the quantities to be estimated is as follows:

$$Range = \sqrt{(x_e - x_p)^2 + (y_e - y_p)^2}$$

where $x_p$ and $y_p$ are the x and y positions of the platform, which are again presumed to be known accurately through some navigation system.

In each of the above examples, the measurement is a function of the two quantities being estimated, $x_e$ and $y_e$. All of the other terms in each of the examples are presumed to be known quantities, thus, each measurement represents one function of two unknowns. This set of functions of the two unknowns $x_e$ and $y_e$ can be expressed in general terms, where the total number of measurements is n, as follows:

$$m_1 = f_1(x_e, y_e)$$

$$m_2 = f_2(x_e, y_e)$$

.

.

.

$$m_n = f_n(x_e, y_e)$$

where $m_i$ is the $i^{th}$ measurement, and $f_i$ is the corresponding functional relationship between $m_i$ and $x_e$ and $y_e$. Note that these measurements are those that would be obtained if the measurement devices or sensors used were perfect, or had no measurement error.

This set of n equations and two unknowns can be written using matrix notation as:

$$\underline{m} = F(\underline{x})$$

where $$\underline{m} = \begin{bmatrix} m_1 \\ m_2 \\ \vdots \\ m_n \end{bmatrix}$$

and $$\underline{x} = \begin{bmatrix} x_e \\ y_e \end{bmatrix}.$$

Again, $F(\underline{x})$ is the set of measurements that would be obtained by perfect sensors, that is, sensors that have no error. Since, however, no sensor or measurement device is perfect, each measurement has some error, $\Delta m$, associated with it, and the set of actual measured values is given by:

$$\underline{\tilde{m}} = \underline{m} + \underline{\Delta \tilde{m}}.$$

By modeling the set of measurement errors as a set of random variables, then the set of measurements is also a set of random variables, and the accuracy of the measurement devices or sensors can be categorized by the covariance matrix of measurement errors, $C_M$, which is defined as:

$$C_M = E\{(\tilde{m} - E\{\tilde{m}\}) \times (\tilde{m} - E\{\tilde{m}\})^T\}$$

If the measurement errors are unbiased, then $$E\{\tilde{m}\} = \underline{m}$$

which gives $$C_M = E\{(\Delta\tilde{m}) \times (\Delta\tilde{m})^T\}.$$

The diagonal elements of $C_M$ are the variances, or the square of the standard deviation of each measurement device, and reflect the accuracy of each measurement device. The off-diagonal elements of $C_M$ are the covariances between measurement devices, and indicates the dependency of the value of a measurement from one sensor on the value of a measurement from another sensor. Often measurements from different sensors are independent, and the off-diagonal elements are zero.

Given the covariance matrix $C_M$, the joint probability density of measurements can be expressed as:

$$p(\tilde{m}) = \sqrt{\frac{1}{(2\pi)^n |C_M|}} \exp\left[-\frac{1}{2}(\tilde{m} - F(\underline{x})^T C_M^{-1}(\tilde{m} - F(\underline{x}))\right].$$

This joint probability density is centered around $F(\underline{x})$, the set of measurements that would be obtained if there were no errors in the measurement devices. The objective, however, is, given a set of actual measurements $\tilde{m}$, find some estimate of the unknown quantities $\underline{x}$. This estimate of $\underline{x}$ is called $\hat{\underline{x}}$, and the Maximum Likelihood Estimate (MLE) is the estimate of $\underline{x}$ that maximizes the joint probability density $p(\tilde{m})$ for the set of actual measurements $\tilde{m}$. The joint probability density of measurements in terms of the estimate of $\underline{x}$ is written as:

$$p(\tilde{m}) = \sqrt{\frac{1}{(2\pi)^n |C_M|}} \exp\left[-\frac{1}{2}(\tilde{m} - F(\hat{\underline{x}})^T C_M^{-1}(\tilde{m} - F(\hat{\underline{x}}))\right].$$

To find $\hat{\underline{x}}$ that maximizes $p(\tilde{m})$, the above expression is differentiated with respect to $\hat{\underline{x}}$, the result is set to zero, and then $\hat{\underline{x}}$ is solved. This results in the following system of equations:

$$J^T(\hat{\underline{x}}) C_M^{-1} F(\hat{\underline{x}}) - J^T(\hat{\underline{x}}) C_M^{-1} \tilde{m} = \underline{0}$$

where J, the Jacobian matrix, is given by:

$$J = \frac{\partial F(\underline{x})}{\partial \underline{x}} = \begin{bmatrix} \frac{\partial f_1}{\partial x_e} & \frac{\partial f_1}{\partial y_e} \\ \frac{\partial f_2}{\partial x_e} & \frac{\partial f_2}{\partial y_e} \\ \vdots & \vdots \\ \frac{\partial f_n}{\partial x_e} & \frac{\partial f_n}{\partial y_e} \end{bmatrix}.$$

In general, this yields a set of l equations for the l unknown quantities in $\hat{\underline{x}}$. In the case of two-dimensional location, l=2. This Maximum Likelihood Estimate is the estimate that provides the values of the unknown quantities $\hat{\underline{x}}$ that are the most likely to have resulted in the measurements $\tilde{m}$.

A closed form solution to this set of equations, however, may not be easy to obtain, especially for higher values of l, given the general non-linear expressions in $F(\hat{\underline{x}})$. A novel approach is a Generalized Recursive MLE method in which an initial guess of $\hat{\underline{x}}$ is made, called $\hat{\underline{x}}_0$, and then the above system of equations is "linearized" about the "point" $[\hat{\underline{x}}_0, \underline{y}_0]$, $\underline{y}_0$, where $\underline{y}_0 = F(\hat{\underline{x}}_0)$, by replacing $F(\hat{\underline{x}})$ with a linear approximation of $F(\hat{\underline{x}})$ about the point $[\hat{\underline{x}}_0, \underline{y}_0]$, and by replacing the dependant function $J(\hat{\underline{x}})$ with the constant $J_0 = J(\hat{\underline{x}}_0)$. This linearized set of equations is then solved for $\hat{\underline{x}}$. This solution represents an approximation to the Maximum Likelihood Estimate (MLE) of $\underline{x}$ based on the linearized set of equations. It becomes the next guess at the true MLE of $\underline{x}$, and the process is repeated.

A step-by-step procedure follows.

Step 1. Pick an initial guess for $\hat{\underline{x}}$ called $\hat{\underline{x}}_0$. Evaluate $\underline{y}_0 = F(\hat{\underline{x}}_0)$ to give the point $[\hat{\underline{x}}_0, \underline{y}_0]$.

Step 2. Create the constant matrix $J_0 = J(\hat{\underline{x}}_0)$.

Step 3. Create a linearized approximation to $F(\hat{\underline{x}})$ given by $F_L(\hat{\underline{x}}) = J_0 \cdot (\hat{\underline{x}} - \hat{\underline{x}}_0) + \underline{y}_0$.

Step 4. "Linearize" the set of equations $J^T(\hat{\underline{x}}) C_M^{-1} F(\hat{\underline{x}}) - J^T(\hat{\underline{x}}) C_M^{-1} \tilde{m} = \underline{0}$ by replacing $J(\hat{\underline{x}})$ with $J_0$ and $F(\hat{\underline{x}})$ with $F_L(\hat{\underline{x}})$, giving $$J_0^T C_M^{-1} F_L(\hat{\underline{x}}) - J_0^T C_M^{-1} \tilde{m} = \underline{0}, \text{ or}$$

$$J_0^T C_M^{-1} [J_0 \cdot (\hat{\underline{x}} - \hat{\underline{x}}_0) + \underline{y}_0] - J_0^T C_M^{-1} \tilde{m} = \underline{0}.$$

Step 5. Solve the above linearized set of equations for $\hat{\underline{x}}$ to obtain an approximate MLE of $\underline{x}$ based on the set of equations linearized about the point $[\hat{\underline{x}}_0, \underline{y}_0]$:

$$\hat{\underline{x}} = \hat{\underline{x}}_0 + [J_0^T C_M^{-1} J_0]^{-1} J_0^T C_M^{-1} [\tilde{m} - \underline{y}_0].$$

Step 6. This approximate MLE solution for $\underline{x}$ then becomes the next guess for $\hat{\underline{x}}$, the true MLE of $\underline{x}$, and the process is repeated. A general recursive expression for this approach is given by:

$$\hat{\underline{x}}_{i+1} = \hat{\underline{x}}_i + [J_i^T C_M^{-1} J_i]^{-1} J_i^T C_M^{-1} [\tilde{m} - \underline{y}_i].$$

While the invention has been described in terms of several embodiments, it will be apparent to those skilled in the art that various changes can be made to the described embodiments without departing from the scope of the invention as set forth in the following claims.

What is claimed is:

1. A system comprising:
   a first sensor mounted on a first platform for sampling a first portion of a continuous waveform occurring in a time window and for producing a first signal sample;
   a second sensor mounted on a second platform for sampling a second portion of the continuous waveform occurring in the time window for producing a second signal sample, wherein the first portion and the second portion include a common portion of the continuous waveform; and
   a processor for processing the first and second signal samples to determine time difference of arrival measurements and for applying a maximum likelihood estimation process to combine multiple time difference of arrival measurements, to estimate the location of an emitter of the continuous waveform, wherein the maximum likelihood estimation process is a generalized linearized recursive maximum likelihood estimation process.

2. The system of claim 1, wherein the time difference of arrival measurements are determined by time shifting the first signal sample with respect to the second signal sample and correlating the first and second signal samples.

3. The system of claim 1, wherein the maximum likelihood estimation process combines the time difference of arrival measurements with one or more other measurement types to estimate the emitter location.

4. The system of claim 1, further comprising:
a communications network for transmitting the first and second signal samples to the processor.

5. The system of claim 1, wherein the processor uses the time difference of arrival measurements in combination with the locations of the first and second platforms to determine a location of a source of the continuous waveform.

6. A system comprising:
a first sensor mounted on a first platform for sampling a first portion of a continuous waveform occurring in a time window and for producing a first signal sample;
a second sensor mounted on a second platform for sampling a second portion of the continuous waveform occurring in the time window for producing a second signal sample, wherein the first portion and the second portion include a common portion of the continuous waveform; and
a processor for processing the first and second signal samples to determine time difference of arrival measurements and for applying a maximum likelihood estimation process to combine multiple time difference of arrival measurements, to estimate the location of an emitter of the continuous waveform, wherein the processor transforms the time shifted first signal sample and the second signal sample from the time domain into the frequency domain, and then frequency shifts the transform of the time shifted first signal sample with respect to the transform of the second signal sample and correlates the transform of the time shifted first signal sample and the transform of the second signal sample, wherein maximum correlation occurs at a frequency shift equal to the frequency difference of arrival of the continuous waveform at the first and second sensors.

7. The system of claim 6, wherein the processor applies the maximum likelihood estimation process to both the time difference of arrival measurements and frequency difference of arrival measurements, in combination with the locations of the first and second platforms to determine the location of the emitter.

8. The system of claim 7, wherein the maximum likelihood estimation process includes other measurements from other platforms or pairs of platforms.

9. A method comprising the steps of:
using a first sensor mounted on a first platform to sample a first portion of a continuous waveform occurring in a time window to produce a first signal sample;
using a second sensor mounted on a second platform to sample a second portion of the continuous waveform occurring in the time window to produce a second signal sample, wherein the first portion and the second portion include a common portion of the continuous waveform;
time shifting the first signal sample with respect to the second signal sample;
correlating the first and second signal samples to determine a time difference of arrival measurement; and
applying a maximum likelihood estimation process to combine multiple time difference of arrival measurements, to estimate the location of an emitter of the continuous waveform, wherein the maximum likelihood estimation process is a generalized linearized recursive maximum likelihood estimation process.

10. The method of claim 9, wherein the time difference of arrival measurements are determined by time shifting the first signal sample with respect to the second signal sample and correlating the first and second signal samples.

11. The method of claim 9, wherein the maximum likelihood estimation process combines the time difference of arrival measurements with one or more other measurement types to estimate the emitter location.

12. The method of claim 9, wherein maximum correlation occurs at a time shift equal to the time difference of arrival of the continuous waveform at the first and second sensors.

13. The method of claim 9, further comprising the step of:
combining the time difference of arrival measurements with at least one other measurement type.

14. The method of claim 9, further comprising the step of:
transmitting the first and second signal samples to a processing node prior to the time shifting and correlating step.

15. The method of claim 9, further comprising the step of:
using the time difference of arrival measurements in combination with the locations of the first and second platforms to determine a location of a source of the continuous waveform.

16. A method comprising the steps of:
using a first sensor mounted on a first platform to sample a first portion of a continuous waveform occurring in a time window to produce a first signal sample;
using a second sensor mounted on a second platform to sample a second portion of the continuous waveform occurring in the time window to produce a second signal sample, wherein the first portion and the second portion include a common portion of the continuous waveform;
time shifting the first signal sample with respect to the second signal sample;
correlating the first and second signal samples to determine a time difference of arrival measurement;
applying a maximum likelihood estimation process to combine multiple time difference of arrival measurements, to estimate the location of an emitter of the continuous waveform;
transforming the time shifted first signal sample and the second signal sample from the time domain into the frequency domain;
frequency shifting the transform of the time shifted first signal sample with respect to the transform of the second signal sample; and
correlating the transform of the time shifted first signal sample and the transform of the second signal sample, wherein maximum correlation occurs at a frequency shift equal to the frequency difference of arrival of the continuous waveform at the first and second sensors.

17. The method of claim 16, further comprising the step of:
using both the time difference of arrival measurements and frequency difference of arrival measurements in combination with the locations of the first and second platforms to determine the location of the emitter.

18. A system comprising:
a first sensor mounted on a first platform for sampling a first portion of a continuous waveform occurring in a time window and for producing a first signal sample;
a second sensor mounted on a second platform for sampling a second portion of the continuous waveform occurring in the time window for producing a second signal sample, wherein the first portion and the second portion include a common portion of the continuous waveform; and a processor for processing the first and second signal samples to determine frequency difference of arrival measurements and for applying a maximum likelihood estimation process to combine multiple frequency difference of arrival measurements, to estimate the location of an emitter of the continuous waveform, wherein the maximum likelihood estimation process is a generalized linearized recursive maximum likelihood estimation process.

19. The system of claim 18, wherein the processor uses the frequency difference of arrival in combination with the locations of the first and second platforms to determine the location of the emitter.

20. A method comprising the steps of:

using a first sensor mounted on a first platform to sample a first portion of a continuous waveform occurring in a time window to produce a first signal sample;

using a second sensor mounted on a second platform to sample a second portion of the continuous waveform occurring in the time window to produce a second signal sample, wherein the first portion and the second portion include a common portion of the continuous waveform;

determining frequency difference of arrival measurements from the first and second signal samples; and applying a maximum likelihood estimation process to combine multiple frequency difference of arrival measurements, to estimate the location of an emitter of the continuous waveform, wherein the maximum likelihood estimation process is a generalized linearized recursive maximum likelihood estimation process.

21. The method of claim 20, further comprising the step of:

using the frequency difference of arrival measurements in combination with the locations of the first and second platforms to determine the location of the emitter.

* * * * *

UNITED STATES PATENT AND TRADEMARK OFFICE
CERTIFICATE OF CORRECTION

PATENT NO. : 7,551,139 B1 Page 1 of 1
APPLICATION NO. : 11/432940
DATED : June 23, 2009
INVENTOR(S) : David Keith Mesecher It is certified that error appears in the above-identified patent and that said Letters Patent is hereby corrected as shown below:

Column 9, Line 28
Insert --)-- between $^T$ and $C^{M-1}$
And second ")" between ) and ]. should be a larger font Column 9, Line 42
Insert --)-- between $^T$ and $C^{M-1}$
And second ")" between ) and ]. should be a larger font

Column 9, Line 65
"In general, this yields a set of 1 equations for the 1 unknown..."
Should read
"In general, this yields a set of $l$ equations for the $l$ unknown..."

Column 9, Line 66
"In the case of two-dimensional location, 1=2."
Should read
"In the case of two-dimensional location, $l$=2."

Column 10, Line 3
"...may not be easy to obtain, especially for higher values of 1, ..."
Should read
"...may not be easy to obtain, especially for higher values of $l$, ..."

Signed and Sealed this

Twenty-second Day of December, 2009

David J. Kappos
*Director of the United States Patent and Trademark Office*